United States Patent Office 3,523,675
Patented Aug. 11, 1970

3,523,675
VALVE OPERATING APPARATUS WITH LOCKING MEANS
Marvin H. Groove and Lyle R. Van Arsdale, Houston, Tex., assignors to M & J Valve Company, Houston, Tex., a corporation of Delaware
Filed Dec. 18, 1967, Ser. No. 691,381
Int. Cl. F16k 31/143, 35/00
U.S. Cl. 251—94    7 Claims

ABSTRACT OF THE DISCLOSURE

Valve apparatus including power means for moving the valve member of a valve between open and closed operating positions. Locking means is provided for locking the valve member to the body in an operating position. The power operator and locking means are coordinated (e.g. by a common hydraulic system) whereby the locking means is caused to release the valve member immediately before the valve member is moved by the power operator to another operating position.

BACKGROUND OF THE INVENTION

Valves that are made in the larger sizes, such as are used in pipeline systems, are frequently provided with operators of the electrical, pneumatic, gas motor or hydraulic types. When the valve member has been moved to one operating position, it is generally essential that it remain in that position until further operation. Particularly in connection with gate valves made in the larger sizes, the weight of the gate tends to cause it to move from a raised open to its lowermost closed position. Also the valve member may be unbalanced with respect to line pressure, in which event under certain conditions, line pressure may tend to move the valve member in one direction. In the construction of prior valve operators it has been attempted to provide means which prevents movement of the valve member until power is applied. For example, the power may be applied through a non-reversible gear train or linkage. With respect to hydraulic operators of the cylinder-piston type, check valves have been used in the hydraulic connections to provide a hydraulic lock against undesired movement.

For many reasons, a hydraulic or other type of lock incorporated in external valve operating mechanism is not entirely satisfactory. For example, it is frequently necessary to repair valves in the field, at which time it is necessary to remove the valve operator. As a result, under certain conditions the gate may not be connected to an operator and may be free to move under the force of gravity or because of an unbalanced differential pressure. Also experience has shown that locking devices incorporated in valve operators are not always safe or reliable.

SUMMARY OF THE INVENTION AND OBJECTS

This invention relates generally to valve apparatus, and particularly to valves which are equipped with power operators.

It is an object of the invention to provide valve apparatus of the above character with locking means whereby normally the valve member is locked in one of its operating positions and is released at the time the power operator is actuated.

Another object of the invention is to provide apparatus of the above character which is particularly applicable to gate valves made in the larger sizes, and which utilizes a hydraulic pressure system for actuation of both the valve operator and gate locking means.

Briefly, the invention consists of a valve body having flow passages and a valve member within the body movable between open and closed operating positions. The power means is mounted upon the valve body and connected to the valve member whereby when the power means is energized, the valve member is moved from one operating position to another. Locking means is also carried by the body and is adapted to lock the valve member with respect to the body in one operating position. The locking means is adapted to be energized to cause it to unlock the valve member. Means is also provided for energizing both the power means and the locking means to effect unlocking of the valve member and movement of the valve member to one of its operating positions.

DESCRIPTION OF THE PREFERRED EMBODIMENTS

Figure 1:
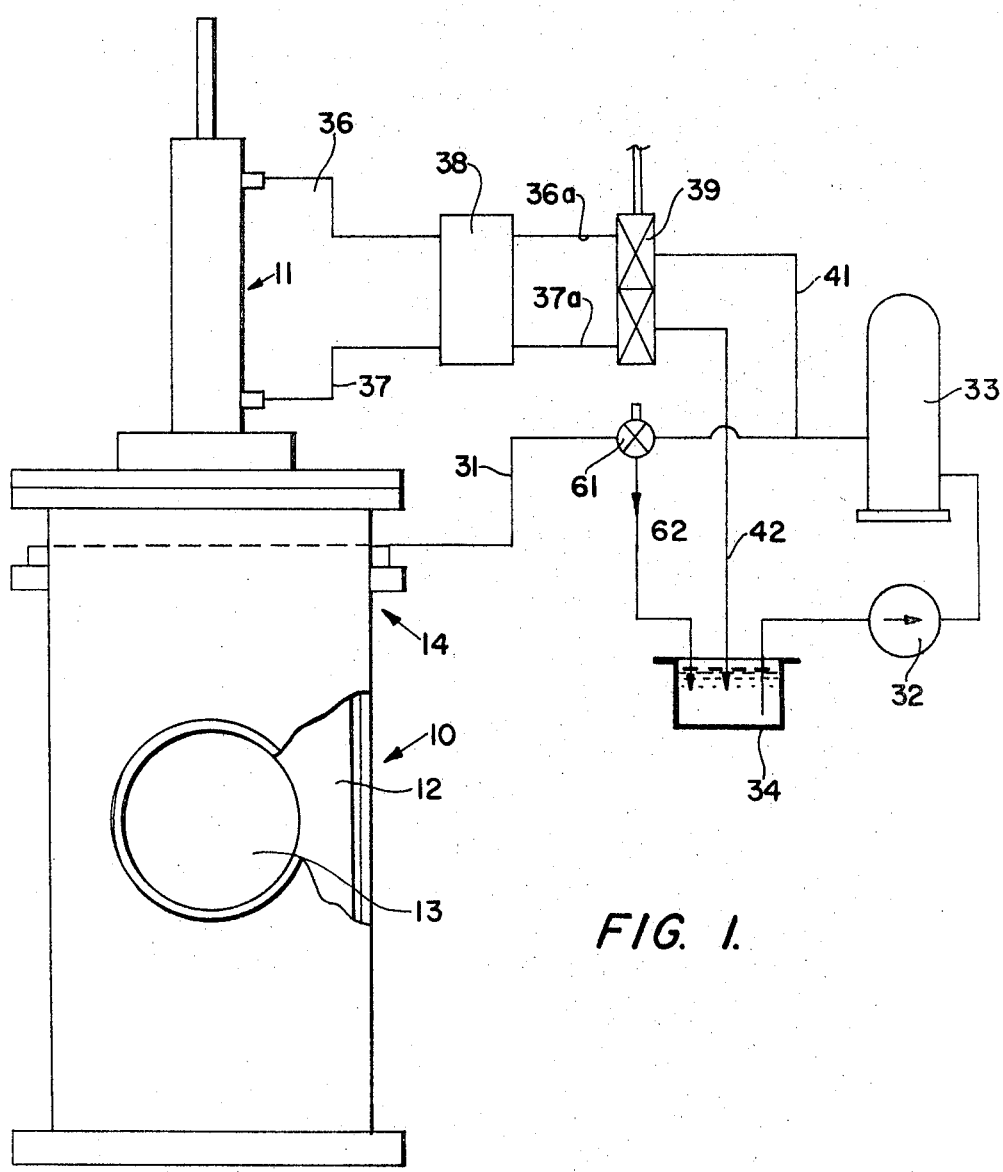
FIG. 1 is an end view of a gate valve provided with a power operator of the hydraulic piston-cylinder type and having automatically released locking means for retaining the gate in full open position.

In FIG. 1 a gate valve 10 is shown provided with a power operator 11 of the hydraulic type. The valve may be of the fabricated body type provided with a flat slab-like gate 12 operating vertically between full open and closed positions and engaging annular sealing assemblies carried by the body. A valve of this type is shown for example in Grove 3,260,503, Grove 3,305,213, and Grove 3,339,886. In this instance, the flat gate 12 within the valve body is provided with a port that registers with the flow passages for full open position of the valve. In other instances a plain gate may be used without such a port, in which event the gate may be considerably shorter. It is assumed that the gate is in its full open position when at its uppermost limit.

At least one direct operating locking device 14 is mounted upon one side of the valve body for locking the valve gate in its raised or full open position. Preferably at least two such locking devices are provided, one upon each side of the valve body as illustrated. These devices are spring urged to locking position. They are actuated to unlocked position by application of fluid under pressure.

Figure 2:
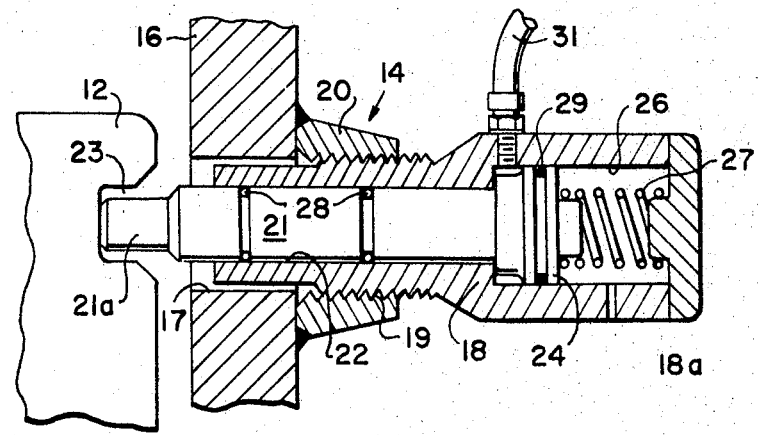
FIG. 2 is a section on an enlarged scale showing one of the hydraulically released locking devices indicated in FIG. 1.

As shown in FIG. 2, the side wall 16 of the valve body is provided with an opening 17 which accommodates the locking device 14. The device consists of a fitting 18 which has threaded engagement 19 with a spud 20, the spud being welded to the body wall 16. A pin 21 is slidably fitted within the bore 22, and the end portion 21a of this pin is adapted to be accommodated within a recess 23 formed in the valve gate 12. A piston 24 is formed on the exterior end of pin 21 and is slidably fitted within the bore 26 formed in the portion 18a of fitting 18. A compression spring 27 urges the piston 24 and the pin 21 toward the left as viewed in FIG. 2. Sealing means 28 (e.g. of the O-ring type) is provided between the pin 21 and the periphery of bore 22, and the piston 24 is similarly sealed as by means of the resilient O-ring 29. A hydraulic pipe line 31 is shown communicating with the space on one side of the piston 24, and because this piston is substantially larger in diameter than the pin 21, application of hydraulic fluid under pressure by way of line 31 causes the piston 24 and pin 21 to be moved toward the right as viewed in FIG. 2 and against the urge of spring 27. The amount of such movement is sufficient to retract the end portion 21a of the pin 21 from the recess 23, thus unlocking the gate with respect to the body. When application of fluid pressure through line 31 is discontinued and this line vented, the piston 24 and the pin 21 return to the locking position shown in FIG. 2.

As shown in FIG. 1, the line 31 leading from one or more devices 14 is connected with the hydraulic system which serves to supply fluid under pressure to the valve operator 11. Such a system may consist of a suitable source of liquid under pressure, represented in this instance by the hydraulic pressure pump 32, the pressure accumulator 33, and the reservoir 34. By means of suitable automatic pressure controls (not shown), pump 32 functions to maintain a predetermined pressure within the accumulator 33.

The ends of the piston-cylinder operator 11 are connected to the hydraulic lines 36 and 37. These lines connect through an interlocking check valve assembly 38 with the four-way control valve 39. Pressure line 41 connects the pressure accumulator 33 with the four-way valve 39, and the return vent line 42 likewise connects the control valve 39 with the reservoir 34. Lines 36a and 37a connect the four-awy valve 39 with the check valve assembly 38.

Figure 4:
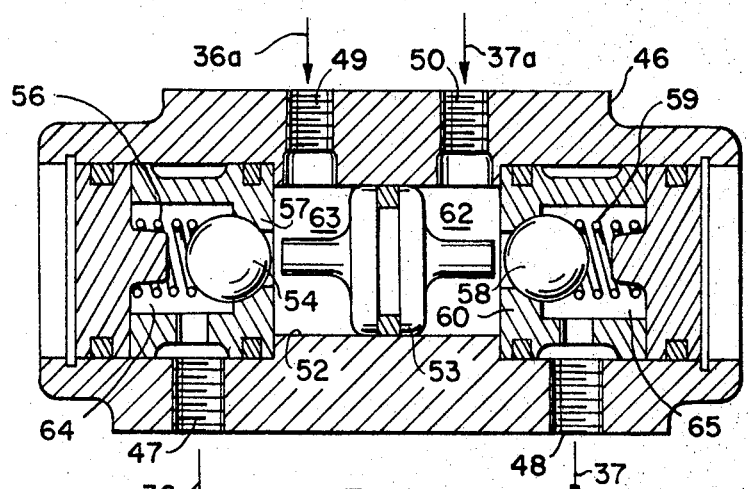
FIG. 4 is a detail in section illustrating a suitable interlocking type of check valve means incorporated in FIG. 1.

A suitable check valve assembly is shown in FIG. 4. A body 46 is provided with ports 47 and 48 for communicating with the lines 36 and 37, and ports 49 and 50 for communicating with lines 36a and 37a. A cylindrical bore within the body serves to accommodate the piston-like shuttle 53. Two check valves are provided and are adapted to be actuated by the shuttle 53. One check valve consists of the valve ball 54 urged by spring 56 against the valve seat 57. The other check valve similarly consists of the valve ball 58 urged by spring 59 against the seat 60. When the shuttle device 53 is moved toward the left by liquid pressure in the chamber 62, the ball 54 is dislodged from its seat 57. Likewise, when the liquid pressure is applied to the space 63, the shuttle 53 is moved to the right to permit ball 54 to dislodge ball 58 from its seat 60. The spaces 62 and 63 are in communication respectively with the ports 50 and 49. Similarly, the spaces 64 and 65 surrounding the balls 54 and 58 are in communication with the ports 47 and 48.

Operation of the above described interlocking check valve assembly is as follows. Assuming that liquid under pressure is applied to line 36a, the shuttle 53 is moved toward the right to dislodge ball 58 from its seat. The pressure of the liquid in chamber 63 also dislodges ball 54 from its seat, thus permitting the application of liquid under pressure through line 36 to the valve operator. At the same time, liquid exhausted from the valve operator flows past the check valve 58, back through the pipe line 37a, through the four-way valve, and then back to the reservoir. If application of fluid through line 36a is discontinued, as when the valve reaches its limiting position, check valve 54 returns to its seat 57 under the urge of compression spring 56, thus establishing a hydraulic lock which retains the valve against reverse movement. When the position of the four-way control valve is changed to apply liquid under pressure to line 37a, shuttle 53 immediately moves to the left, thus dislodging ball 54 from its seat 57. The fluid pressure then opens the ball 58 whereby liquid under pressure is applied through line 42 to the valve operator. Here again, if application of liquid pressure through line 37a is discontinued, the valve ball 58 returns to its seat to establish a hydraulic lock.

Referring again to FIG. 1, the line 31 leading from the locking devices 14 is connected through a valve 61 with the liquid pressure line 41. Also a vent line 62 is shown connecting valve 61 to the reservoir 34. It is assumed that valve 61 is of such character that it can be conditioned to connect line 31 with pressure line 41, or connect line 31 with line 62. When valve 61 connects line 31 with pressure line 41, it is evident that liquid under pressure is applied to the piston 24 of the device 14, thus causing the pin 21 to be retracted, thereby removing the pin portion 21a from the gate recess 23. Valve 61 may be manually operated, it may be connected for conjoint operation with the four-way valve 39, or controlled from some remote control station.

Operation of the apparatus shown in FIG. 1 can be summarized as follows. When the gate is in its raised full open position illustrated in FIG. 1, the pin portion 21a is disposed within the gate recess 23, and therefore the gate is locked against movement. Assuming now that it is desired to lower the gate to closed position, the operator first causes valve 61 to be actuated to connect line 31 with pressure line 41, whereby the pin 21 is retracted to unlock the gate. Immediately thereafter, the four-way valve 39 is positioned to cause liquid under pressure to be supplied through line 36 to the hydraulic operator 11, with liquid being exhausted through line 37, whereby the piston of the operator moves downwardly to force the gate to closed position. Subsequently, when it is desired to move the gate back to full open position, and to lock it in that position, the four-way valve 39 is positioned to supply hydraulic liquid through line 37 whereby the gate is moved to its upper most limit. Valve 61 is now conditioned whereby line 31 is vented through line 62, thus permitting the spring 27 to urge the pin 21 back toward locking position.

It will be evident that the apparatus of FIG. 1 makes for positive assurance with respect to the locked condition of the gate. It is possible to lock and unlock the gate hydralically even though the hydraulic operator 11 may be detached from its connection with the gate. The positive lock provided by each device 14 is not dependent upon the hydraulic lock provided by the check valve assembly 38.

Figure 5:
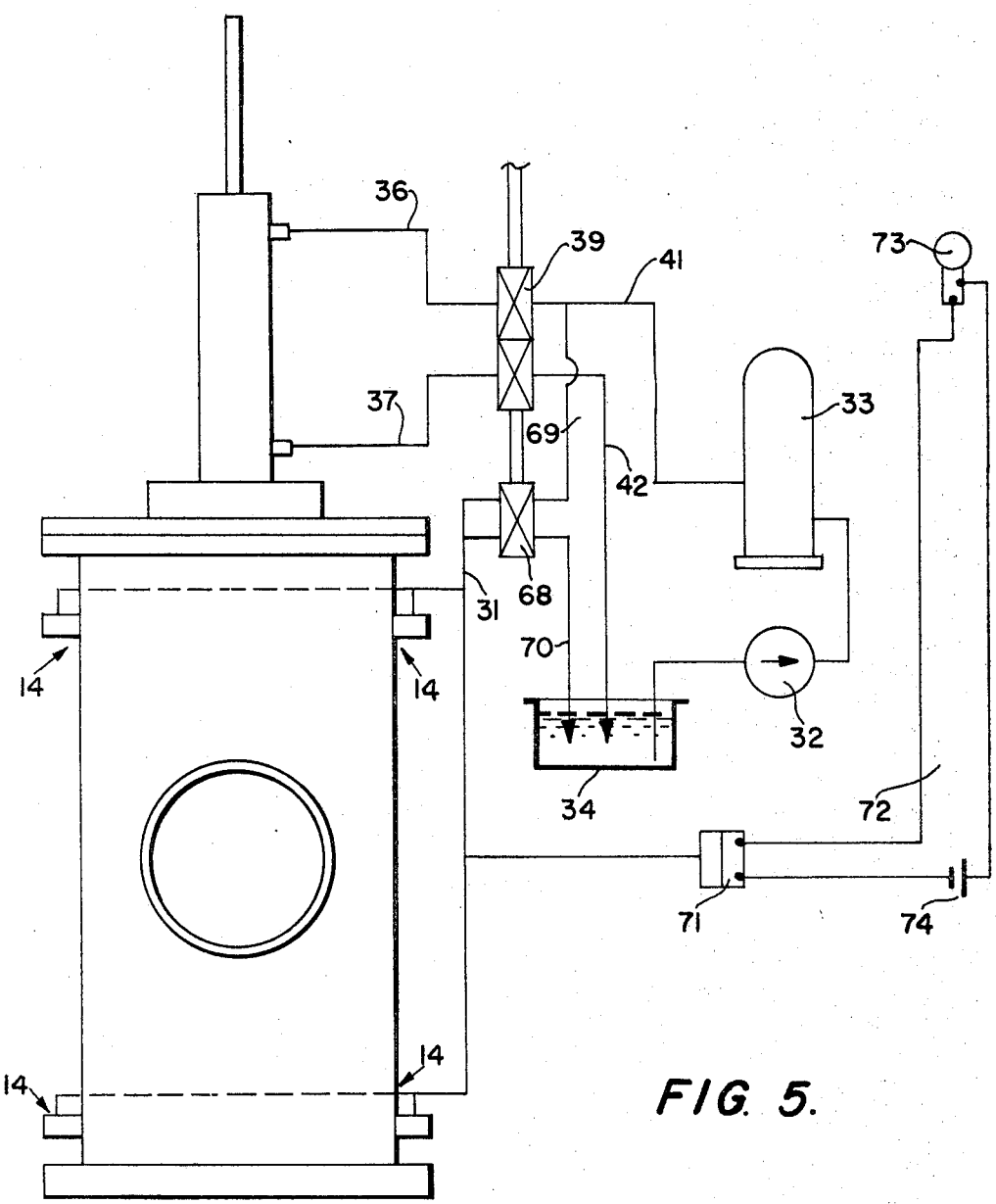
FIG. 5 is a view like FIG. 1 but illustrating another embodiment of the invention.

In the embodiment illustrated in FIG. 5, the check valve assembly 38 has been omitted. It is assumed in this instance that the four-way valve 39 is constructed in such a manner that its operating rod returns from extreme positions to a neutral position in which both lines 36 and 37 are locked against flow of liquid. Also in this instance the operating rod of the four-way valve 39 is mechanically connected to the operating member of a valve 68. This valve has a connection 69 with pressure line 41 and a vent line 70. It also has ports connecting to the line 31 which leads to all of the locking devices. It is assumed in this instance that the valve is equipped with locking devices located at both the upper and lower corners of the body.

Valve 68 is constructed whereby for the extreme positions of the operating rod of the four-way valve 39, line 31 is connected through porting in valve 68 with the line 69 and pressure line 41. However, for the intermediate neutral position of the four-way valve 39, line 31 is connected through porting in valve 68 with the vent line 70.

FIG. 5 also illustrates a simple indicator to show whether or not the gate is locked or unlocked. Thus a pressure switch 71 has a fluid connection with the line 31, and its contacts are in series with a circuit 72 which includes the signal lamp 73 and the source of current 74. It will be apparent that with this arrangement, when sufficient pressure exists in line 31 to effect the unlocking of the devices 14, this pressure closes the contacts of switch 71 to illuminate the lamp 73. Conversely, when line 31 has been vented, the contacts of switch 71 are opened with the result that lamp 73 is extinguished, thus indicating that the locking devices are in locking condition.

Figure 3:
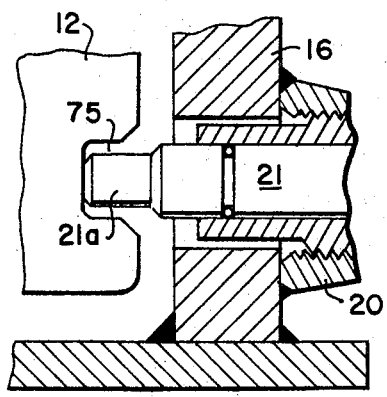
FIG. 3 is a section on an enlarged scale, similar to FIG. 1, but showing a locking device at the lower end of the gate body.

In FIG. 5 locking devices 14 are shown at both the lower and upper side corners of the body. As shown in FIG. 3 the lower devices 14 can be the same as shown in FIG. 2 except that the pin portion 21a engages in a notch or recess 75 in the lower corner of the gate 12. Thus with the arrangement of FIG. 5 all four devices 14 are released simultaneously when hydraulic pressure is applied, and the gate is locked in both upper open and lower closed positions.

Figure 6:
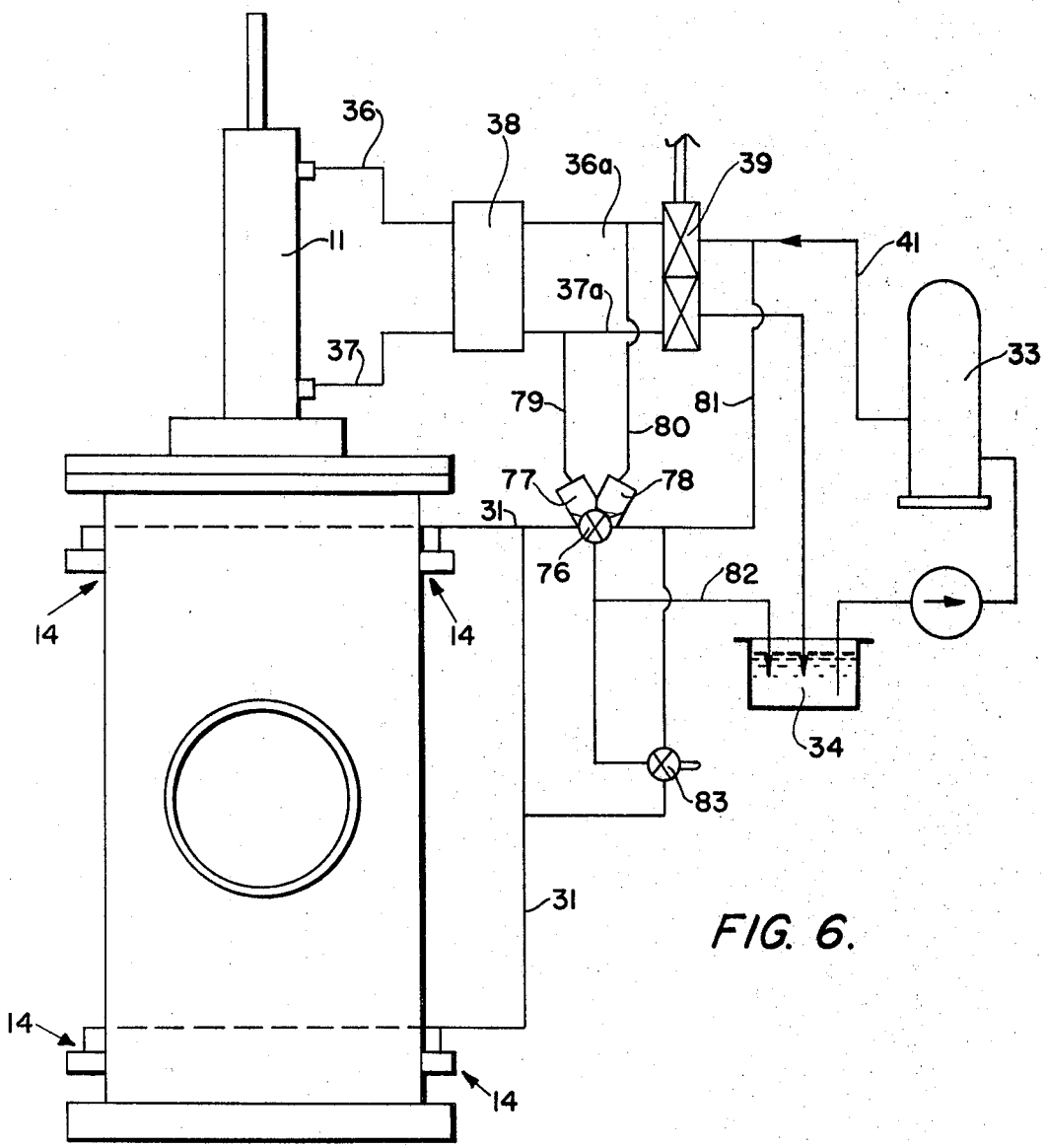
FIG. 6 is a view like FIG. 1 but illustrating another embodiment of the invention.

FIG. 6 illustrates another embodiment which makes use of a check valve assembly 38 as in FIG. 1. In this instance a valve 76 is mechanically connected to two small fluid pressure operators 77 and 78. These operators connect by lines 79 and 80 with the lines 36a and 37a. Line 31 connects through valve 76 with line 81, and from thence to the pressure line 41. Also it has a vent line 82 leading to the reservoir 34. An overriding manual valve 83 is also shown connected between line 31 and line 81 and to the vent line 82.

It is assumed that valve 76 is spring biased to a position in which it normally causes lines 31 and 82 to be in communication through its porting. However, when fluid pressure is applied to either operator 77 or 78, valve 76 is conditioned whereby line 31 is placed in communication with line 81. It will be evident that when the four-way valve 39 is operated to move the gate toward either closed or open positions, hydraulic pressure is supplied to either operator 77 or 78, with the result that valve 76 is conditioned to supply hydraulic liquid under pressure from line 41 through line 81, and to the line 31. However, when pressure is not being supplied to either line 36a or 37a, valve 76 is conditioned to cause line 31 to be vented through line 82, thus causing all of the devices 14 to assume locking positions.

The manual valve 83 can be used to effect unlocking of the devices 14 when the hydraulic operator is removed from the valve and is not connected to the gate.

Figure 7:
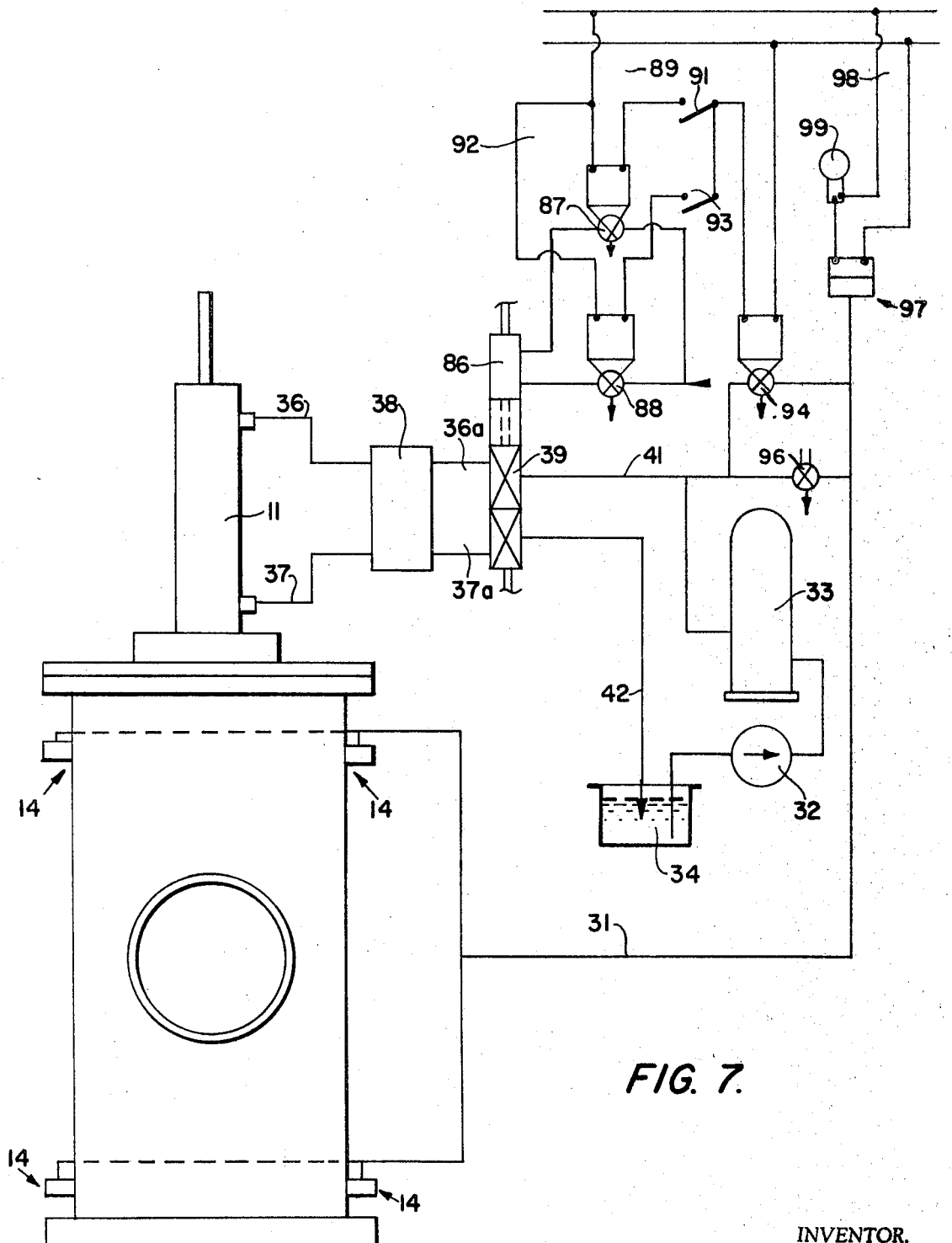
FIG. 7 is a view like FIG. 1 but illustrating a further embodiment.

In the embodiment illustrated in FIG. 7, the four-way valve 39 has its operator connected to a pneumatic piston-cylinder operator 86. Solenoid operated valves 87 and 88 control the supply of air to one side or the other of the pneumatic operator 86, thus moving the operating member of the four-way valve 39 between its two extreme operating positions. The windings of solenoid valve 87 are controlled by a circuit 89 which includes the contacts of switch 91. Likewise, the windings of solenoid valve 88 are controlled by circuit 92 which includes the contacts of switch 93. Thus the closing of one or the other of the switches 91 and 93 causes pneumatic actuation of the operator 86, with the result that the four-way valve 39 is positioned to cause the operator 11 to be actuated to move the valve gate from one operating position to another. The closing of switch 91 or switch 93 also serves to energize the windings of the solenoid valve 94 which is connected between the pressure line 41 and the line 31 leading to the devices 13. Manual valve 96 is shown shunting the solenoid valve 94. Signal means is shown in FIG. 7, including the pressure operated switch 97 having pressure connection with line 31, the contacts of which control the circuit 98 for the signal lamp 99.

It will be evident that with the apparatus of FIG. 7 there is conjoint operation of the four-way valve 39 and the valve 94 which supplies liquid under pressure to the locking devices 14. Here again the locking devices are hydraulically retained in retracted positions during the time interval required for the hydraulic operator 11 to move the gate of the valve between operating positions.

We claim:
1. In valve apparatus, a valve comprising a body having aligned flow passages and a valve member within the body movable between open and closed operating positions, a fluid pressure operated device connected to the valve member for operating the same between said operating positions, said device having two closed fluid chambers, a hydraulic system connected to said chambers and including a control valve and a source of liquid under pressure, said system serving to carry out an operating cycle in which liquid is supplied under pressure to one chamber of said device while liquid is exhausted from the other chamber in response to operation of said control valve, means incorporated in said system for trapping liquid in said chambers after each operating cycle, a fluid pressure operated locking device carried by the valve body and adapted to lock the valve member in an operating position, said locking device having a closed hydraulic chamber and being actuated from locked to unlocked condition of the same when fluid pressure is applied to said chamber, means providing fluid communication between the chamber of the locking device and said hydraulic system whereby liquid under pressure is supplied to the chamber of the locking device when the hydraulic system is actuated by setting of the control valve to carry out an operating cycle and also serving to vent said chamber after an operating cycle is completed.

2. Apparatus as in claim 1 in which said last means includes a valve serving to control application of liquid pressure to the chamber of said locking device and venting of liquid from the same.

3. Apparatus as in claim 2 in which means is provided to effect operation of the last named valve simultaneously with operation of the control valve.

4. Apparatus as in claim 3 in which said last named valve is mechanically connected to the control valve to effect its operation simultaneously with operation of the control valve.

5. Apparatus as in claim 3 in which the last named valve is adapted to be operated by application of fluid pressure and has fluid pressure connections with the hydraulic system to effect its operation.

6. Apparatus as in claim 3 in which the last named valve is electrically operated, together with an energizing circuit connected to operate the same, said circuit also serving to effect operation of the control valve.

7. Apparatus as in claim 1 in which at least two of said locking devices are provided, one for locking the valve member in each position of the same, the fluid chambers of the two locking devices being in communication.

References Cited

UNITED STATES PATENTS

| 2,648,346 | 8/1953 | Deardorff et al. | 251—62 XR |
| 2,802,483 | 8/1957 | Davis | 251—94 XR |
| 2,844,166 | 7/1958 | Edman | 251—94 XR |

FOREIGN PATENTS 1,058,802  6/1959  Germany.

HENRY T. KLINKSIEK, Primary Examiner

U.S. Cl. X.R.

251—62